United States Patent [19]
Smith

[11] Patent Number: 5,374,082
[45] Date of Patent: Dec. 20, 1994

[54] COMBINE HEADER TRANSPORT OSCILLATION FRAME

[75] Inventor: David R. Smith, Fort Jennings, Ohio

[73] Assignee: Unverferth Manufacturing Co., Inc., Kalida, Ohio

[21] Appl. No.: 75,411

[22] Filed: Jun. 14, 1993

[51] Int. Cl.$^5$ .......................... B60P 3/00; B62D 21/20
[52] U.S. Cl. .................................. 280/789; 280/111;
56/228; 410/2; 296/3; 180/DIG. 15
[58] Field of Search ............... 280/789, DIG. 15, 111,
280/781, 656; 296/3; 410/2, 44; 56/228

[56] References Cited
U.S. PATENT DOCUMENTS

| | | | |
|---|---|---|---|
| 2,107,384 | 2/1938 | McQueen | 280/111 |
| 3,245,695 | 4/1966 | Bernard | 56/228 |
| 3,408,089 | 10/1968 | Edwards | 280/111 |
| 4,371,299 | 2/1983 | Cain et al. | 296/3 |
| 4,834,598 | 5/1989 | Bruns | 410/2 |
| 5,040,825 | 8/1991 | Kuhns | 280/789 |

OTHER PUBLICATIONS

McCurdy Division, Unverferth Manufacturing Co., Inc., "McCurdy Combine Header Transport", 1982.
E-Z Trail, Inc., "E-Z Trail Combine Header Transport", undated.
Kill Brothers Co., "Killbros. Utility Transport", undated.

*Primary Examiner*—Mitchell J. Hill
*Assistant Examiner*—Peter C. English
*Attorney, Agent, or Firm*—Henderson & Sturm

[57] ABSTRACT

The present invention relates to a combine header transport having a wheeled chassis with front and rear axle units, at least one longitudinally extended rail interconnecting the axle units, and a second rail spaced transversely from the first rail to support the combine header during transport, the improvement comprising interconnecting at least one end of the first rail to one of the axles in a manner to allow the one axle to oscillate relative to the first rail thereby allowing the wheels to be more evenly loaded when the unit is traversing uneven roads.

7 Claims, 3 Drawing Sheets

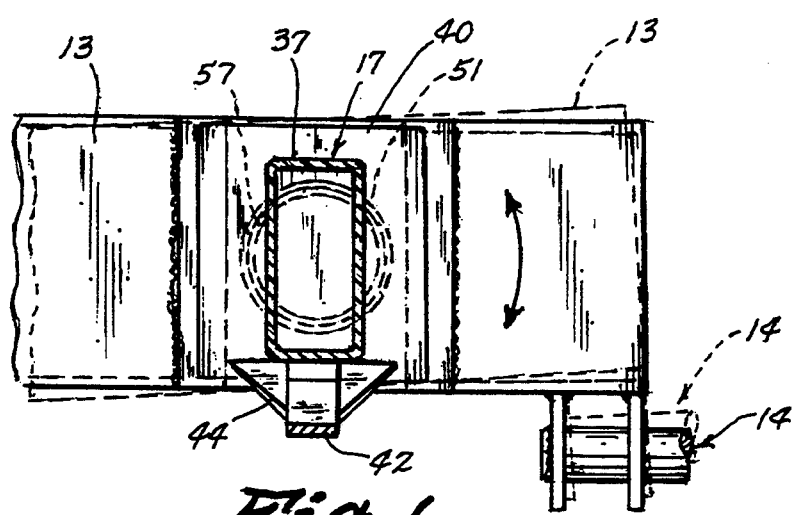
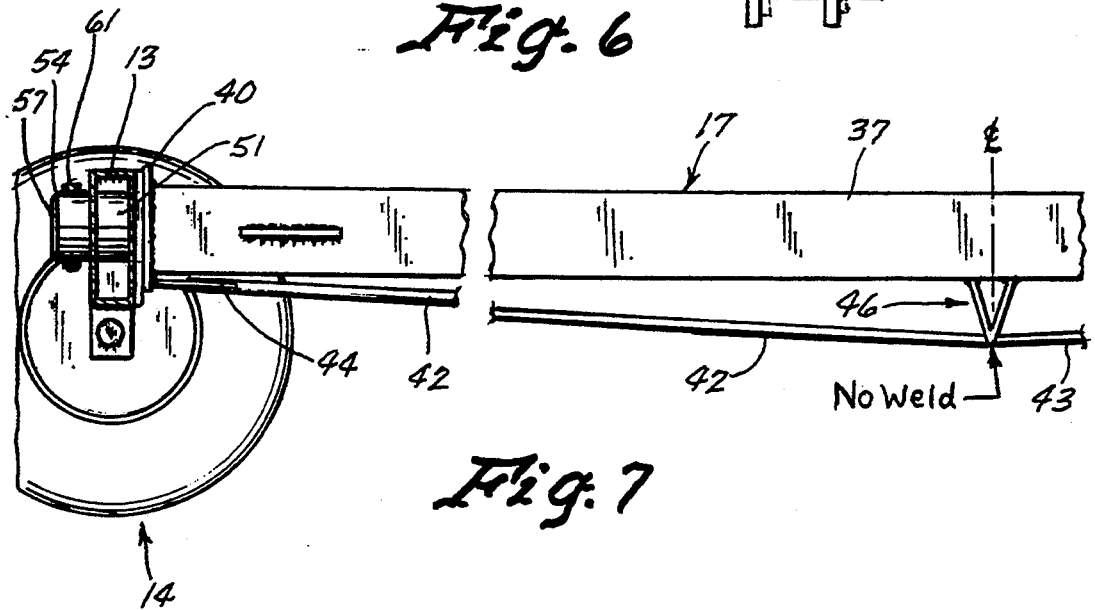

COMBINE HEADER TRANSPORT OSCILLATION FRAME

TECHNICAL FIELD

The present invention relates generally to a combine header transport and more particularly to a transport having a wheeled chassis with an axle at each end and a lower rest bar and an upper rest bar, one end of the lower rest bar interconnected with one of the axles such that the one axle oscillates about the lower rest bar end when the transport moves over uneven terrain.

BACKGROUND OF THE INVENTION

In order to provide safe and reliable transport of combines on highways, the header of a combine is detached therefrom and carried on transports of a trailer type such that the longer axis of the header is supported longitudinally upon the transport. The transports are of a size to carry a grain platform of up to 15 feet and a corn head of up to six rows.

Although header transports are comprised of various structural arrangements, each includes a chassis having a front and rear axle, a wheel mounted at each axle end, one or more frame members interconnecting the axles, a lower rest bar also interconnecting the axles, a raised upper rest bar disposed parallel to the lower rest bar, and mechanisms for adjustably raising and lowering the upper rest bar. This arrangement, plus the provision of a number of header rest brackets adjustably mounted on the lower rest bar enables this generic-type header to support most, if not all, headers and grain platforms of known size and shape.

Due, nevertheless, to the normally elevated nature of the upper rest bar, relative to the lower rest bar, the provision of evenly loading the wheels is important, particularly when the transport is traveling over an uneven road. The fixed nature of the chassis works against such even loading due to its rigidity; thus it is to this area of the conventional transport that this invention is directed.

DISCLOSURE OF THE INVENTION

The combine header transport of the present invention comprises generally the provision of a bearing mounted within the rear axle and in longitudinal alignment with the lower rest bar, a bearing tube mounted on one end of the lower rest bar for extension through the bearing and with an outer portion thereof exposed, a collar disposed adjacent to the rear axle for rotatably embracing the exposed portion, and a securement device for locking the exposed portion within the collar, such that the rear axle is allowed to rotate or oscillate about the bearing tube. The loading, therefore of the two rear wheels is more nearly constant when the transport is traveling over uneven roads.

It is an object of this invention to provide a transport for large, bulky items, such as a combine header which transport, when loaded with the header, moves quite evenly over public highways.

Another object of this invention is to provide an improved structural arrangement for evenly loading the four wheels of a combine header transport.

Yet another object of this invention is to provide a transport which has improved stability for transporting heavy loads such as combine headers over highways with uneven surfaces.

Still another object of this invention is to provide a combine header transport having a non-rigid chassis whereby torsional rigidity of the chassis is considerably reduced, thereby allowing the wheels to be more evenly loaded when the transport is traversing uneven roads.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 6 is a vertical sectional view as taken along the line 6—6 in FIG. 5; and

FIG. 7 is a side elevational view as taken along the line 7—7 in FIG. 1, foreshortened for clarity of illustration.

BEST MODE FOR CARRYING OUT THE INVENTION

Figure 1:
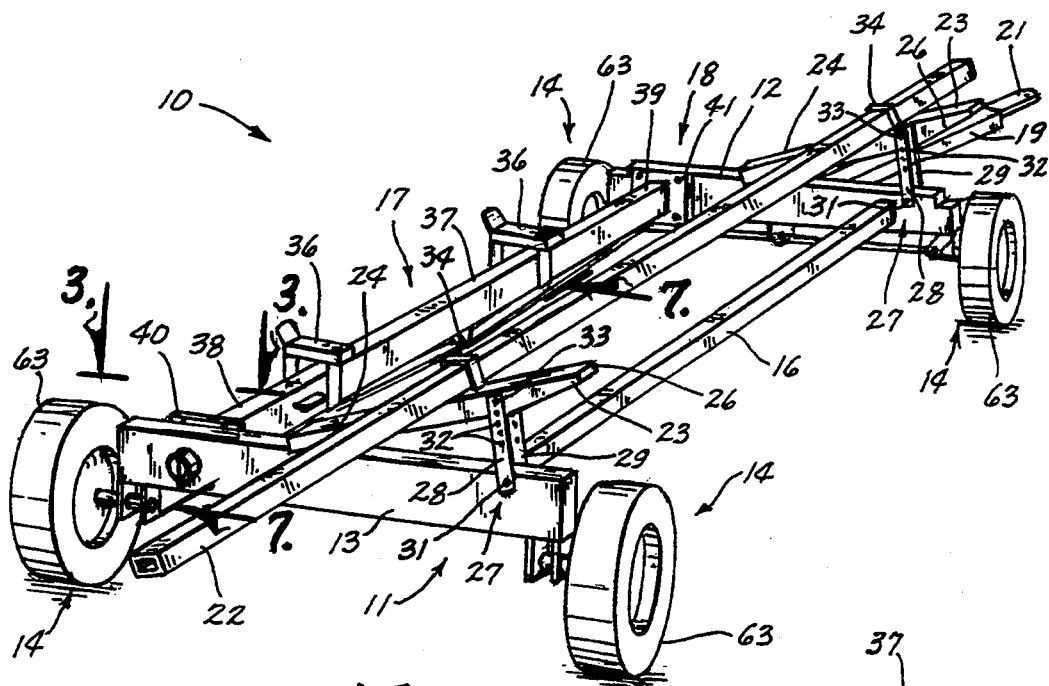
FIG. 1 is a perspective view of the transport of this invention.

Referring to FIG. 1, the transport of this invention is indicated generally at (10), utilized for transporting bulky objects such as a conventional combine header (not shown). The transport (10) comprises a chassis (11) having a pair of axles (12), (13) longitudinally spaced from each other and extended transversely of the chassis (11). A wheel unit (14) is mounted at each end of each axle (12), (13) by conventional means such as to provide a four-wheel transport, the axle (12) located at the front of the transport (10), and the axle (13) located at the rear of the transport (10). At least one longitudinally extended frame member (16) is interconnected between the front and rear axles (12), (13) on one side of the chassis (11), and a lower rest bar unit (17) is interconnected between the front and rear axles (12), (13) on the other side thereof, completing a rectangular framework for the chassis (11).

At the front end (18) (FIG. 1) of the chassis (11), a tongue (19) is pivotally mounted to the front axle (12) in a conventional manner whereby the tongue (19) may pivot and swivel relative to the axle (12). A clevis (21) is secured to the forward end of the tongue (19) for easy attachment of the tongue to a prime mover (not shown). A second, upper rest bar (22) is adjustably mounted above the frame member (16) on the chassis (11). The adjustable mounting comprises a pair of plates (23) each having a lower end (24) pivotally connected to a respective axle (12), (13) centrally thereof as best illustrated in FIG. 1, and each having an opposite end (26) elevated to a predetermined raised position by a mounting unit (27). The mounting unit (27) includes a pair of strap members (28), (29) disposed in a parallel arrangement on either side of each plate (23), each strap member (28), (29) pivotally connected at a lower end (31) to the respective axle (12), (13), and having a plurality of spaced openings (32) formed therein near the other end such that a fastener (33) may be inserted through any longitudinally aligned pair of openings (32) and an opening (not shown) provided therefor in the respective plate (23). A clamp (34) is connected to the upper surface of each plate (23) and secured to the upper rest bar (22).

With the added provision of a plurality of header rest brackets (36) slidably mounted in longitudinally spaced arrangement on the lower rest bar unit (17), each bracket (36) having a plurality of height positions, the transport (10) is adapted to support a wide range of headers as to size and shape, the header resting on both the lower rest bar unit (17) and the upper rest bar (22), as adjusted.

The lower rest bar unit (17) includes a lower rest bar (37) having opposed ends (38), (39) each end having a bearing plate (40), (41) secured thereto, the bar (37) braced with a pair of trusses (42), (43) (FIG. 7) secured between an outer plate unit (44) (FIGS. 3 and 5) secured to the base of each bearing plate (40), (41) and a center plate unit (46) secured centrally of the bar (37).

Figure 2:
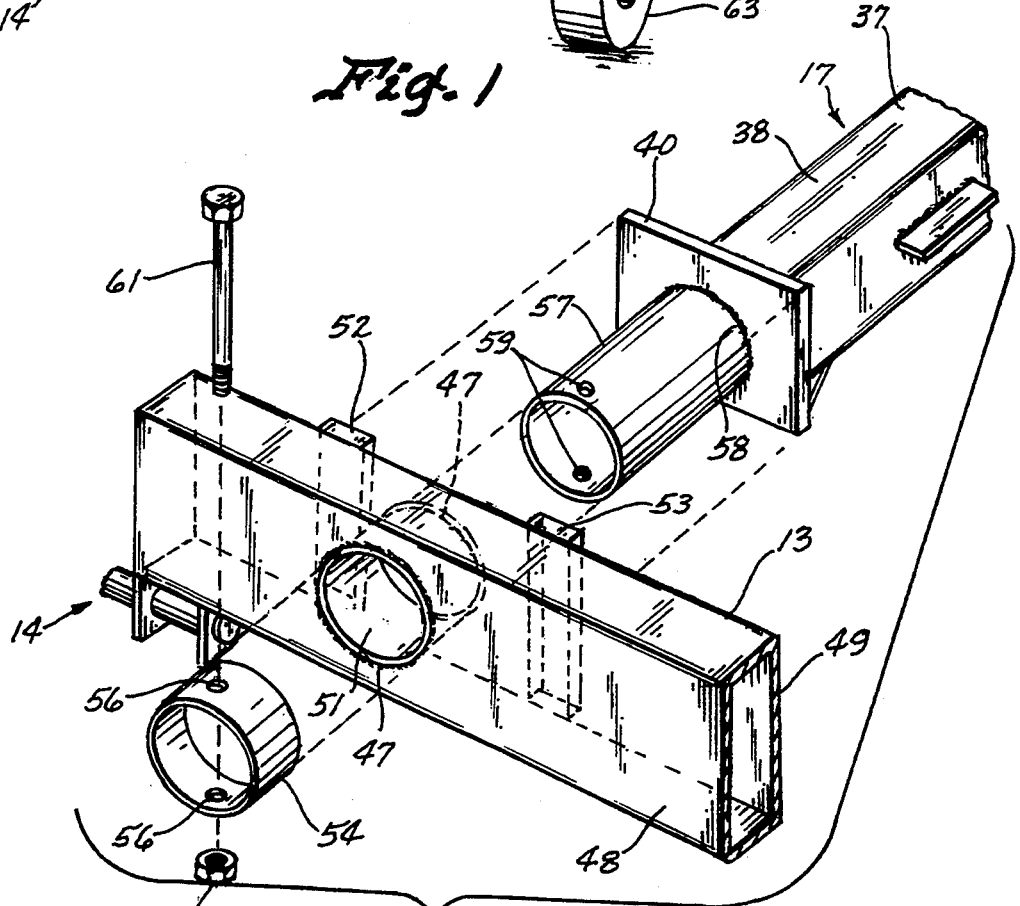
FIG. 2 is an enlarged exploded perspective view of the primary elements of this invention.

The rear axle (13) has a circular opening (47) formed in each side (48), (49) (FIG. 2) thereof within which a circular bearing (51) is secured, as by welding, the bearing (51) being in longitudinal alignment with the lower rest bar (37). On opposite, transverse sides of the opening (47) on the side (49) facing the bar (37), a pair of rubbing blocks (52), (53) are mounted in vertical disposition. On the other side (48) of the rear axle (13) a circular collar (54) is placed about the opening (47) and next to the axle (13); the collar having an inner diameter identical to that of the openings (47), an outer diameter larger than the openings (47), and having further a pair of aligned holes (56) formed therein.

Figure 3:
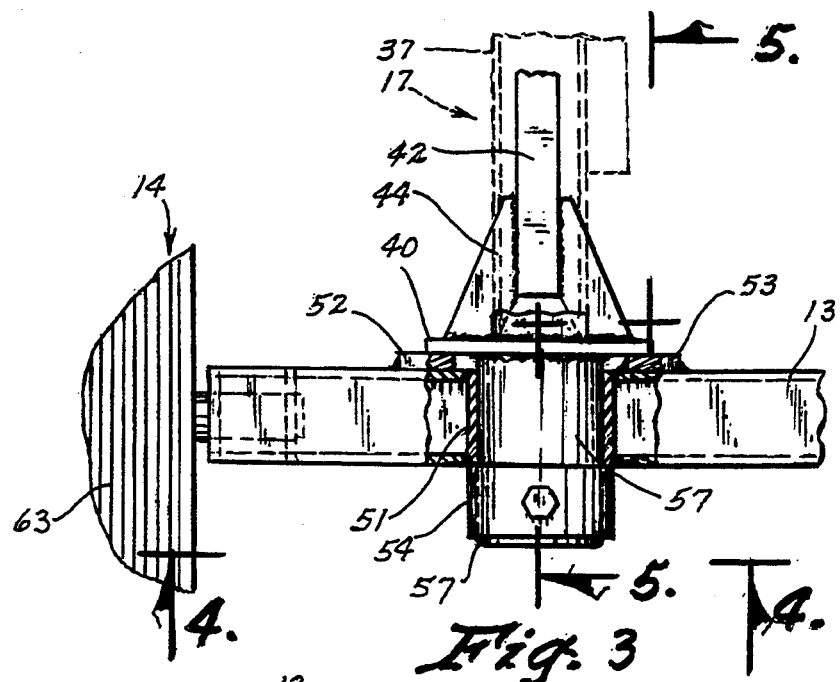
FIG. 3 is a plan view as taken along the line 3—3 in FIG. 1.
Figure 4:
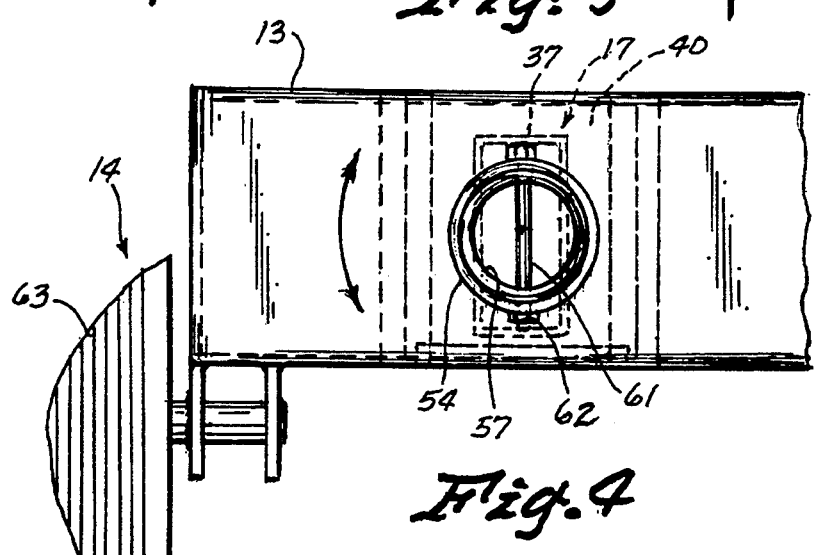
FIG. 4 is an elevational view of the rear of FIG. 3 as taken along the line 4—4 in FIG. 3.
Figure 5:
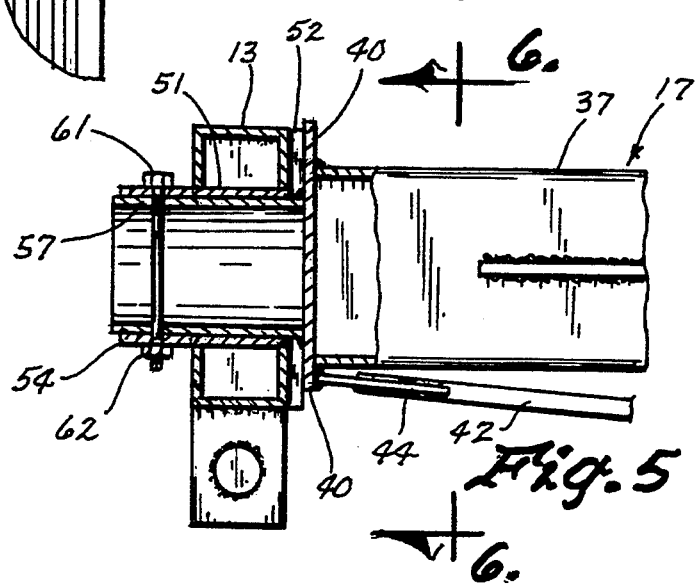
FIG. 5 is an elevational view of the side of FIG. 3 as taken along the line 5—5 in FIG. 3.

For engagement within the bearing (51) and the collar (54), a bearing tube (57) is secured, as by welding at one end (58) (FIGS. 2 and 5) to the bearing plate (40), and with a pair of aligned passages (59) (FIG. 2) formed in the other end. The outer diameter of the bearing tube (57) is slightly less than the inner diameter of the bearing (51) and collar (54) for freely rotating therewithin, and the length of the bearing tube provides for its insertion through the bearing (51) and into the collar (54) such that the passages (59) are aligned with the holes (56); and whereby the bearing plate (40) is frictionally engaged with the rubbing blocks (52), (53) (FIGS. 3 and 5).

Rotation of the bearing tube (57) within the collar (54) which embraces the tube (57) is prevented however, by a fastening bolt (61) (FIG. 2) being inserted through the aligned passages (59) and holes (56), secured as by a nut (62), such that the collar (54) and tube (57) are fixedly connected together; but leaving the rear axle (13) free to rotate or oscillate about the bearing tube (57) and within a plane substantially normal to the longitudinal axis of the lower rest bar (37) which bar (37) is disposed itself normal to the transversely extended axle (13).

By this arrangement, the oscillation joint formed by this structure reduces the torsional rigidity of the header transport (10) providing for the load of a header on the transport (10) to be more uniform on the wheel units (14), particularly the two rear wheels (63) (FIG. 1), thus providing for a more stable pulling of the transport (10) over uneven roads.

I claim:

1. A transport for transporting a large bulky object, the transport having a chassis on wheels for rollably supporting the chassis, the chassis being formed of longitudinally interconnected axles, including a pair of axles spaced longitudinally from each other and extended transversely of the chassis, and first and second support means transversely spaced from each other to support transversely spaced portions of the object to be transported when the object is placed on the chassis, each said support means separately interconnected with each of said axles at opposed ends thereof and forming thereby a rectangular framework, wherein the improvement comprises:

at least one of said support means extended along one side of the chassis and mounted lower than the other said support means, and including an elongated bar having opposite ends, with each end connected to one of said pair of axles, and means securing one of said bar ends to a respective one of the axles in a rotatable manner, whereby the one axle is adapted to oscillate about said bar one end.

2. The improvement of claim 1, and further wherein said bar is disposed normal to the transversely extended axles.

3. The improvement of claim 2 and further wherein said one axle can oscillate about on end and in a plane substantially normal to the longitudinal axis of said bar.

4. The improvement of claim 1, and further wherein said securing means includes:
   bearing means formed in said one axle;
   tube means formed on said bar one end and freely rotatably disposed within said bearing means;
   collar means disposed adjacent said one axle and in longitudinal alignment with said bearing means and embracing said tube means; and
   fastening means securing said collar means to said tube means for preventing fore-and-aft movement therebetween, thereby reducing the torsional rigidity of the transport.

5. The improvement of claim 4, and further wherein said bearing means includes a bearing, and said tube means includes a tube extended through said bearing and into said collar means.

6. The improvement of claim 5, and further wherein the one axle has opposed sides, one side having an opening therein for receiving said tube, and the opposite side having an opening about which said collar means is disposed.

7. The improvement of claim 6, and further wherein said collar means includes a collar connected to said tube for retaining said tube within said bearing while providing for oscillation of said one axle about said tube.

* * * * *